United States Patent Office 3,523,903
Patented Aug. 11, 1970

---

3,523,903
PHOTOCHROMIC CIS-1-ARYL-2-NITROALKENES COMPOSITIONS
Aaron L. Bluhm, Canton, Mass., assignor to the United States of America as represented by the Secretary of the Army
No Drawing. Original application Apr. 18, 1966, Ser. No. 544,354, now Patent No. 3,328,466, dated June 27, 1967. Divided and this application Mar. 22, 1967, Ser. No. 627,246
Int. Cl. G03c
U.S. Cl. 252—300   4 Claims

---

ABSTRACT OF THE DISCLOSURE

Transparent media containing photochromic cis-1-aryl-2-nitroalkenes which develop color upon exposure to light.

---

This is a division of application Ser. No. 544,354, filed Apr. 18, 1966, now U.S. Pat. No. 3,328,466, June 27, 1967.

This invention relates to photochromic nitroalkenes, more particularly to photochromic cis-1-aryl-2-nitroalkenes and to transparent media containing these compounds.

The compounds of this invention all exhibit photochromic properties, i.e. the ability to change in color or develop a color when exposed to radiation in the ultraviolet and visible light range and upon withdrawal of the source of radiation to return to their original colorless state. This property can be employed to great advantage wherever it is desirable to effect a change in color under different light conditions as, for example, in light filter systems. The photochromic compounds of this invention may be incorporated in transparent plastic sheets or films which may be used alone or laminated to glass as window materials which will automatically develop a color and darken as the light striking the material becomes brighter and correspondingly will lose its color and become more transparent as the light striking the material dims. Such a built-in light screen or filter would eliminate the need of other types of light screens conventionally used for this purpose. An important military application for such light filter devices is in connection with the protection of personnel from unexpected, high intensity, blinding flashes of light which would occur in the area of a nuclear explosion. Unprotected observers of such explosions are temporarily or permanently blinded by the intence ultraviolet and visible light radiation resulting therefrom. Transparent eye shields containing the compounds of this invention change in optical density with sufficient speed upon exposure to a suitable light stimulus to screen out a substantial portion of the visible and near visible radiation, thereby minimizing or preventing eye injury.

The compounds discovered to have photochromic properties according to this invention are the cis isomers of certain 1-aryl-2-nitroalkenes having the general formula

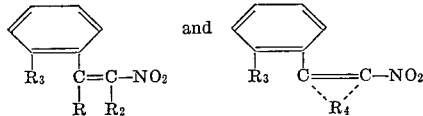

wherein $R_1$ represents a radical selected from the group consisting of hydrogen, nitro, methyl, phenyl, and benzyl; $R_2$ represents a radical selected from hydrogen and phenyl; $R_3$ represents a radical selected from hydrogen, nitro and methoxyl; and $R_4$ is tetramethylene. The cis and trans designations as used herein relate to the orientation of the nitro and phenyl groups in the above formulae.

The photochromic compounds of this invention undergo a change in color on exposure to light which is on the order of 1 microsecond. For example, these compounds in solution phase show immediate color development when exposed to a light pulse of 0.5 microsecond duration. High optical densities are obtainable with these compounds in transparent media, for example, an optical density of 2.0 can be obtained when dilute solutions ($10^{-4}$ moles per liter) of the cis forms of the compounds of Examples I–X in ethanol contained in a 20 cm. glass cell are irradiated with a light pulse having an energy of 2,000 joules and a duration of 0.5 microsecond. According to Baer's Law relationships, the same optical density would be obtained utilizing a cell with a path length of 1.0 min. and a solution with a concentration of $2\times10^{-3}$ moles per liter. Higher optical densities can be obtained with more concentrated solutions.

Photochromic behavior of the compounds of this invention in the following examples is determined by flashing a solution of the compound at room temperature and measuring the fading rate at 420 m$\mu$. Flash photolysis equipment having a photoylsis light source capable of generating intense pulses of light with a duration in the microsecond range similar to that disclosed by L. Lindquist in Rev. Sci. Instr., 35, 993 (1964), is employed to study these fast photochromic reactions.

The preparation of specific photochromic compounds, some of which are novel compounds, will be described in detail in the following examples:

EXAMPLE I

Cis-$\beta$-nitrostyrene

Trans-$\beta$-nitrostyrene is a commercially available compound having a M.P. of 57–8° C. and shows an infrared absorption at 10.34$\mu$ characteristic of the trans configuration. An ethanol solution of this compound does not show any photochromic properties when flashed with the flash photolysis lamp, with a light pulse having an energy of 2000 joules and a duration of 0.5 microsecond.

The ethanol solution is exposed to ultraviolet light from an unfiltered low pressure mercury lamp for five minutes. The solution is then flashed and was found to be photochromic at 420 m$\mu$. The photochromism is due to the presence of cis isomer in the solution which can be verified by N.M.R. spectra.

EXAMPLE II

Cis-$\alpha$-methyl-$\beta$-nitrostyrene

By passing a stream of nitric oxide gas over a reservoir of nitric acid and through $\alpha$-methylstyrene, a mixture of $\alpha$-methyl-$\beta$-nitrostyrene and $\alpha$-nitromethylstyrene was obtained. This is similar to the procedure of C. A. Burkhard and J. F. Brown, Jr., U.S. Pat. 2,867,669, Jan. 6, 1959. Pure trans $\alpha$-methyl-$\beta$-nitrostyrene was obtained by cold crystallization from ethanol at −80°. The compound is liquid at room temperature.

*Analysis.*—Calcd. for $C_9H_9NO_2$ (percent): C, 66.24; H, 5.56; N, 8.59. Found (percent): C, 66.39; H, 5.80; N, 8.55.

The infrared spectrum showed nitro group absorptions at 1520 and 1345 cm.$^{-1}$, and a stretching vibration due to the ethylenic group at 1628 cm.$^{-1}$. The ultraviolet spectrum showed maximum at 294 and 227 m$\mu$ (EtOH). The N.M.R. spectra showed the methyl absorption at 7.4$\tau$ (CCl$_4$, relative to tetramethylsilane). This trans compound was flashed in ethanol solution and not found to be photochromic.

The cis isomer (with respect to phenyl and nitro groups) was obtained by irradiating an ethanol solution of the trans compound for 48 hours in a photochemical reactor equipped with 2537 m$\mu$ lamps. The pure cis isomer was obtained by low pressure distillation, B.P. 110°/0.1 mm. Hg.

*Analysis.*—Calcd. for $C_9H_9NO_2$ (percent): C, 66.24; H, 5.56; N, 8.59. Found (percent): C, 66.36; H, 5.67; N, 8.63.

The molecular weight indicated the presence of a monomer. Calcd. for monomer, 163.2; dimer, 326.3. Found: 171.0. The infrared spectrum showed nitro absorptions at 1520 and 1345 cm.$^{-1}$ and ethylenic group at 1635 cm.$^{-1}$. In the ultraviolet spectrum, shoulders were observed at 270 and 235 m$\mu$. The N.M.R. spectra showed a shift of the methyl group to 7.9$\tau$ which is indicative of the cis configuration.

An ethanol solution of the cis isomer is flashed as in Example I and the photochromism was observed at a wavelength of 420 m$\mu$.

EXAMPLE III

2-nitro-1-phenylcyclohexene 2-nitro-1-phenylcyclohexene was prepared by reacting 1-phenylcyclohexene with nitrogen trioxide according to the procedure of Govindachari et al. described in J. Chem. Soc., 1956, 4280. This compound exists in only one configuration in which the nitro and phenyl groups are cis to one another. This compound was photochromic on flashing without any preirradiation.

EXAMPLE IV

Cis-1,2-diphenyl-1-nitroethylene

The trans compound (with respect to the nitro and phenyl groups) was prepared according to the procedure of Meisenheimer described in Ann., 355, 249–311 by the alkali treatment of 1,2-diphenyl-1,2-dinitroethane. The product, M.P. 68° C. was not photochromic in solution.

After irradiation with ultraviolet light of an ethanol solution as in Example I the solution was photochromic. Maximum absorbance of this solution was obtained at 420 m$\mu$.

EXAMPLE V

Cis-1,2-diphenyl-1-nitro-2-benzylethylene

This compound was obtained in the trans form as one of the products of the condensation of benzaldehyde and phenylnitromethane (F. Heim, Ber., 44, 2016) and had a M.P. of 103–4° C. (lit. 102–103°). The structure was confirmed by infrared and elemental analysis. An ethanol solution of this compound was not photochromic.

Irradiation of the ethanol solution of the trans form of this compound as described in Example I produced a solution of the compound that was strongly photochromic and exhibited maximum absorbance at 420 m$\mu$.

EXAMPLE VI

Cis-1,2-dinitro-1,2-diphenylethylene

This compound was obtained as the cis isomer, M.P. 184° (lit. M.P. 186°) by the reaction of nitric oxides with diphenylacetylene (J. Schmidt, Ber., 34, 619). This compound in ethanol solution showed photochromic behavior on flashing without any preliminary irradiation.

EXAMPLE VII

Triphenyl-nitroethylene

This compound which exists in only one configuration, in which the nitro and phenyl groups are cis to each other was prepared by the procedure of F. Bergman described in the J. Am. Chem. Soc., 70, 1618 (1948) by reacting triphenylethylene with nitric acid. An ethanol solution of this compound was photochromic on flashing without any preirradiation.

EXAMPLE VIII

1,1-diphenyl-2-nitroethylene

This compound which exists in only the cis form was obtained by the procedure of Govindachari by reacting 1,1-diphenylethylene with nitrogen trioxide and treating the product with acetic anhydride as described in the Proc. Indian Acad. Sci., 48, 111–118 (1958). An ethanol solution of this compound was found to be photochromic on flashing without any preirradiation.

EXAMPLE IX

Cis 1-o-methoxyphenyl-2-nitroethylene

The trans isomer was prepared by the procedure of Schales et al. described in the J. Am. Chem. Soc., 74, 4486 (1952) by reacting o-methoxybenzaldehyde and nitromethane. This compound showed infrared absorption at 10.34$\mu$ which is characteristic of the trans configuration of the nitro and phenyl groups and was not photochromic.

After exposure of an ethanol solution of the trans isomer to ultraviolet radiation as in Example I, the solution exhibited photochromism at 420 m$\mu$. The presence of cis isomer was established by N.M.R. spectra.

EXAMPLE X

Cis 1-(o-nitrophenyl)-2-nitroethylene

This compound was prepared in the trans form by the procedure of Schales et al. described in J. Am. Chem. Soc., 74, 4486 (1952). This compound in ethanol solution was not photochromic. After an ethanol solution of the trans form was exposed to ultraviolet radiation as in Example I, the solution which contained the compound in the cis form was photochromic when flashed. The conversion to cis isomer was established by N.M.R. spectra.

The photochromic organic compounds of this invention when combined with transparent media as shown in the following examples provides a transparent article which will darken, i.e., increase in optical density, as the intensity of light falling upon the device increases and conversely will lighten (decrease in optical density) as the light intensity decreases. A transparent article or window having this property automatically darkens in response to an increase in the intensity of light falling thereon to screen out or prevent the transmission of a portion of the light.

EXAMPLE XI

A solution of a polymer containing a photochromic compound was prepared by dissolving 100 g. of polystyrene in 250 g. of toluene and adding thereto 1 g. of cis-$\beta$-nitrostyrene. The solution was cast over a sheet of transparent glass and solvent allowed to evaporate leaving a thin film of polystyrene on the glass. In dim light, there is no noticeable color in the glass but when irradiated with direct rays of the sun, a yellow-greenish color appears which darkens the glass. This color disappears when the light is removed. Repeated exposure to and withdrawal of light causes a corresponding darkening and clearing of the glass or more properly the polymeric film thereon.

EXAMPLE XII

A transparent organic polymeric sheet (¼" in thickness) containing a photochromic compound is prepared by adding 25 g. of cis-$\alpha$-methyl-$\beta$-nitrostyrene to 500 gm. of polymethylmethacrylate molding powder, which composition is melted and extruded as a sheet. The photochromic material is uniformly distributed within the transparent polymeric sheet either as microcrystals or in solution. Exposure of the transparent sheet to the light of a high-pressure mercury lamp causes a yellow-greenish color to develop in the sheet which color disappears upon removal of the bright light.

Photochromic properties are detected with the eye when the compounds of this invention are present on or within transparent media in amounts as low as 0.1% by weight. Greater amounts will, of course, increase the darkening effect. The amount present is not critical because even the smallest quantity will produce a photochromic response which may be so slight as to be detected by suitable instruments. It is desirable for most applications that the photochromic material be distributed uniformly over the surface of or within the transparent media. All of the compounds of this invention are suitable for use alone or in combinations of two or more. Combinations of these compounds are frequently advantageous since some of these compounds are susceptible to activation at different wavelengths and produce colors having peak absorbance at different wavelengths.

I claim:

1. Solid media, transparent to visible light, having uniformly distributed on or within said media a photochromic compound selected from the group consisting of
   cis-$\beta$-nitrostyrene,
   cis-$\alpha$-methyl-$\beta$-nitrostyrene,
   cis-1,2-diphenyl-1-nitroethylene,
   cis-1,2-diphenyl-1-nitro-2-benzylethylene,
   cis-1-(o-methoxyphenyl)-2-nitroethylene and
   cis-1-(o-nitrophenyl)-2-nitroethylene.

2. Solid media according to claim 1 wherein said media is glass, transparent to visible light, having a transparent polymeric film coating thereon, and said photochromic compound being uniformly distributed within said polymeric film.

3. Solid media according to claim 2 wherein said media is an organic polymeric material, transparent to visible light, having said photochromic compound uniformly distributed within said polymeric material.

4. A method of regulating the amount of light passing through a solid media, transparent to visible light, which comprises adding a photochromic compound selected from the group consisting of
   cis-$\beta$-nitrostyrene,
   cis-$\alpha$-methyl-$\beta$-nitrostyrene,
   cis-1,2-diphenyl-1-nitroethylene,
   cis-1,2-diphenyl-1-nitro-2-benzylethylene,
   cis-1-(o-methoxyphenyl)-2-nitroethylene and
   cis-1-(o-nitrophenyl)-2-nitroethylene,
to said media so as to effect a substantial uniform planar distribution therein, whereupon as the light intensity falling on said media increases, the photochromic compound develops its characteristic color which serves to absorb light, and when the light intensity decreases, the photochromic compound becomes colorless and no longer absorbs light.

References Cited

UNITED STATES PATENTS

| 3,377,170 | 4/1968 | Giddings et al. | 96—90 |
| 3,407,145 | 10/1968 | Brule | 96—90 |

NORMAN G. TORCHIN, Primary Examiner

R. E. FICHTER, Assistant Examiner

U.S. Cl. X.R.

96—90